United States Patent Office 3,105,078
Patented Sept. 24, 1963

3,105,078
CHLORINATION AND FLUORINATION OF CY-
CLOHEXIMIDE, AND COMPOUNDS PRODUCED
THEREBY
Donald Emory Ayer, Portage Township, Kalamazoo,
Mich., assignor to The Upjohn Company, Kalamazoo,
Mich., a corporation of Delaware
No Drawing. Filed Nov. 15, 1962, Ser. No. 238,026
4 Claims. (Cl. 260—281)

This invention pertains to novel chemical compounds and a novel process for preparing the same. More particularly, the invention pertains to the novel compounds 3 - [2 - (3,5 - dimethyl - 2 - oxycyclohexyl) - 2 - fluoroethyl]glutarimide and 3-[2-(3,5-dimethyl-2-oxocyclohexyl)-2-chloroethyl]glutarimide, and to a novel process for preparing the same.

Cycloheximide, the trivial name for 3-[2-(3,5-dimethyl - 2 - oxocyclohexyl)-2-hydroxyethyl]glutarimide, is a commercially useful agricultural fungicide. However, the use of the comound is limited in the agricultural field because of phytotoxicity.

It has now been found in accordance with this invention that the aforesaid fluoro and chloro derivatives of cycloheximide possess an advantage over cycloheximide in that they lack the general phytotoxic action of cycloheximide. This characteristic enables these new compounds to be used more widely in agricultural applications.

The novel process of the present invention comprises reacting cycloheximide with a fluorinating agent having the formula:

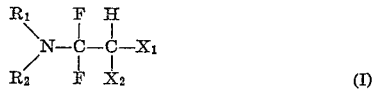

wherein $X_1$ is selected from the class consisting of chlorine and fluorine, $X_2$ is selected from the class consisting of chlorine, fluorine, and trifluoromethyl, $R_1$ and $R_2$ taken individually represent lower-alkyl, and $R_1$ and $R_2$ taken together with >N— constitute a saturated heterocyclic radical containing from 5 to 7 ring atoms, inclusive, one of which, in addition to the amino nitrogen, is selected from the group consisting of carbon, nitrogen, oxygen, and sulfur, the other ring atoms being carbon; or a chlorinating agent such as N,N-diethyl-1,2,2-trichlorovinylamine which can be represented as follows:

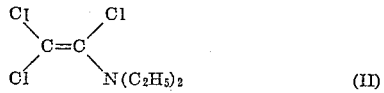

Examples of "lower-alkyl" are methyl, ethyl, propyl, butyl, amyl, hexyl, heptyl, octyl, and isomeric forms thereof. Examples of "saturated heterocyclic radicals containing from 5 to 7 ring atoms, inclusive" are pyrrolidino, 2-methylpyrrolidino, 2,2-dimethylpyrrolidino, and like alkylpyrrolidino groups, 4-methylpiperazino, 2,4-dimethylpiperazino, and like alkylpiperazino groups, morpholino, thiomorpholino, piperidino, 2-methylpiperidino, 3-methylpiperidino, and like alkylpiperidino groups, hexamethyleneimino, 2-methylhexamethyleneimino, homomorpholino, and the like.

Examples of fluorinating agents having the Formula I are N -(2 - chloro - 1,1,2 - trifluoroethyl)diethylamine, N - (1,1,2,2 - tetrafluoroethyl)diethylamine, N - (2 - chloro-1,1,2-trifluoroethyl)dimethylamine, N-(2-chloro-1,2,2-trifluoroethyl)diisobutylamine, N-(2-chloro-1,1,2-trifluoroethyl)dioctylamine, N-(2-chloro-1,1,2-trifluoroethyl) methylethylamine, N - (2,2 - dichloro - 1,1 - difluoroethyl)diethylamine, N - (1,1,2,3,3-hexafluoropropyl)diethylamine, N - (1,1,2,2-tetrafluoroethyl)diisopropylamine, and the like. The preferred fluorinating agent for use in process of the invention is N-(2-chloro-1,1,2-trifluoroethyl)diethylamine.

The process of the invention is carried out conveniently by bringing together the cycloheximide and the fluorinating or chlorinating agent in the presence of an inert organic solvent. The temperature at which the reaction is carried out can range from about 0° C. to about 100° C. However, a preferred temperature range is between about 0° C. and about 50° C.

The term "inert organic solvent" means any organic solvent which does not react with the fluorinating or chlorinating agent and in which cycloheximide is appreciably soluble, for example, aromatic and aliphatic hydrocarbons, halogenated hydrocarbons, esters, ketones, ethers, and tertiary alcohols. Examples of such solvents are benzene, toluene, chlorobenzene, pentane, hexane, cyclohexane, ethyl acetate, butyl acetate, acetone, methyl ethyl ketone, tetrahydrofuran, ethyl ether, tert-butyl alcohol, tert-amyl alcohol, methylene chloride, chloroform, carbon tetrachloride, ethylene dichloride, ethylidene chloride, propylene chloride, trimethylene chloride, and the like.

Advantageously, the fluorinating agent having the Formula I and the chlorinating agent having the Formula II above is employed in excess of the stoichiometric quantity based on the starting cycloheximide. Preferably, it is present to the extent of about 1.0 to 10 moles per mole of cycloheximide.

In many instances the yield of the fluoro and chloro derivatives of cycloheximide obtained in the process of the invention can be increased significantly by the incorporation in the reaction mixture of a tertiary amine hydrofluoride or tertiary amine hydrochloride, respectively. Tertiary amine hydrofluorides and hydrochlorides which can be employed for this purpose are those having the formula $R_3R_4R_5N \cdot HF$ and $R_3R_4R_5N \cdot HCl$ wherein $R_3$, $R_4$, and $R_5$ are selected from the class consisting of lower-alkyl and aralkyl from 7 to 13 carbon atoms, inclusive, and $R_3$ and $R_4$ taken together with >N— constitute a saturated heterocyclic radical containing from 5 to 7 ring atoms, inclusive, as hereinbefore defined.

Examples of "aralkyl from 7 to 13 carbon atoms, inclusive," are benzyl, phenethyl, phenylpropyl, benzhydryl, and the like.

Examples of tertiary amine hydrofluorides and hydrochlorides having the formula $R_3R_4R_5N \cdot HF$ and

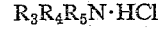

are the hydrofluorides and hydrochlorides of trimethylamine triethylamine, tripropylamine, tributylamine, triisobutylamine, trioctylamine, diethylbenzylamine, methyldiethylamine, propyldimethylamine, N-methylpyrrolidine, N,2,2-trimethylpyrrolidine, N-methylpiperidine, N,2-dimethylpiperidine, N,N'-dimethylpiperazine, NN'-diethylpiperazine, N-methylmorpholine, N-ethylmorpholine, and the like.

Advantageously, the tertiary amine hydrofluorides and hydrochlorides, when employed in the process of the invention, are present in a proportion within the range of about 1 mole to about 20 moles per mole of the cycloheximide starting material.

The novel compounds of the invention, 3-[2-(3,5-dimethyl - 2-oxocyclohexyl)-2-fluoroethyl]glutarimide and 3 - [2 - (3,5 - dimethyl - 2-oxocyclohexyl)-2-chloroethyl] glutarimide are sedatives and can be used in effecting sedation in mammals and like animals. The novel compounds of the invention also exhibit selective antifungal activity in the soil against *Rhizoctonia solani* and can be used to control the population of this fungus in a soil. Further, the novel compounds of the invention inhibit the growth of the fungus *Microsporum canis* at a concentration of 10 mcg./ml. and can be used to treat skin infections caused by this fungus. The effectiveness and safety of these compounds in treating humans has not as yet been established.

The following examples describe some preferred forms and practices of this invention, but they are not to be construed as limiting the scope thereof.

EXAMPLE 1

*Preparation of N-(2-Chloro-1,1,2-Trifluoroethyl) Diethylamine*

A total of 15 ml. of trifluorochloroethylene was condensed in a pressure tube cooled in an acetone-Dry Ice (solid carbon dioxide) bath. To the pressure tube was added 10.3 ml. of diethylamine previously cooled to —40° C. and the tube was then sealed, placed in an ice bath and allowed to warm slowly to room temperature. The tube and contents were then allowed to stand for 48 hrs. at room temperature before cooling the tube, opening the latter and distilling the contents under reduced pressure with minimum exposure to atmospheric moisture. There was thus obtained 15.7 g. (85% yield) of N-(2-chloro-1,1,2-trifluoroethyl)diethylamine in the form of a liquid having a boiling point of 33° to 34° C. at a pressure of 6 mm. of mercury.

Using the above procedure but replacing diethylamine by dimethylamine, diisopropylamine, dibutylamine, pyrrolidine, 2-methylpyrrolidine, 2,2-dimethylpyrrolidine, 4-methylpiperazine, morpholine, piperidine, and 2-methylpiperidine, there are obtained N-(2-chloro-1,1,2-trifluoroethyl)dimethylamine, N-(2-chloro-1,1,2-trifluoroethyl)diisopropylamine, N-(2-chloro-1,1,2-trifluoroethyl)dibutylamine, N-(2-chloro-1,1,2-trifluoroethyl)pyrrolidine, N-(2-chloro-1,1,2-trifluoroethyl)-2′-methylpyrrolidine, N-(2-chloro-1,1,2-trifluoroethyl)-2′,2′-dimethylpyrrolidine, N-(2-chloro-1,1,2-trifluoroethyl)-4′-methylpiperazine, N-(2-chloro-1,1,2-trifluoroethyl)morpholine, N-(2-chloro-1,1,2-trifluoroethyl)piperidine, and N-(2-chloro-1,1,2-trifluoroethyl)-2′-methylpiperidine, respectively.

Similarly, using the procedure of Example 1, but replacing trifluorochloroethylene by 2,2-dichloro-1,1-difluoroethylene there is obtained N-(2,2-dichloro-1,1-difluoroethyl)diethylamine.

Similarly, using the procedure of Example 1, but replacing trifluorochloroethylene by perfluoropropene there is obtained N-(1,1,2,3,3,3-hexafluoropropyl)diethylamine.

EXAMPLE 2

*3-[2-(3,5-Dimethyl-2-Oxocyclohexyl)-2-Fluoroethyl] Glutarimide*

A solution of 25.2 g. (89.6 millimoles) of cycloheximide in 400 ml. of methylene chloride was cooled to 5° C. and 30 ml. (35.7 g., 188 millimoles) of N-(2-chloro-1,1,2-trifluoroethyl)diethylamine was added. The mixture was allowed to stand overnight at 25° C. and then cooled to 5° C. Upon the addition of 50 ml. of cold water, the organic layer was separated, washed successively with water, aqueous sodium bicarbonate solution, and water before being dried over anhydrous magnesium sulfate. The dried solution was filtered and the filtrate was distilled initially at atmospheric pressure to remove solvents and finally at 90° C. under a pressure of 1 mm. of mercury. After evaporation, a mixture of crystals and an oil remained. Trituration of this mixture with methanol gave 2.98 g. of crystals having a melting point of 107° to 130° C. The filtrate which was concentrated and cooled to —20° C. yielded an additional 7.2 g. of crystals having a melting point of 105° to 130° C. Crystallization from 1:1 acetonitrile-water gave 5.8 g. of crude 3-[2-(3,5-dimethyl-2-oxocyclohexyl)-2-fluoroethyl]glutarimide having a melting point of 133° to 144° C. and containing about 28% anhydrocycloheximide as shown by ultra-violet absorption. To remove the anhydrocycloheximide, the material (5.8 g.) was dissolved in a mixture of 30 ml. of methylene chloride and 200 ml. of methanol, and ozonized at 5° C. for 10 min. (about 10 meq. of $O_3$). Several ml. of water were then added, the solution was heated on the steam bath and then allowed to evaporate in the hood. The residue was crystallized from acetonitrile - water and acetone - Skellysolve B (isomeric hexanes) to give 3.34 g. of 3-[2-(3,5-dimethyl-2-oxocyclohexyl)-2-fluoroethyl]glutarimide having a melting point of 153–155° C.; an optical rotation of $[\alpha]_D^{25} = -39°$ (c., 0.44 $CHCl_3$); infrared absorption at the following frequencies expressed in reciprocal centimeters: 3210, 3100, 1715, 1705, 1680 (sh), 1150, 1140, 1050; and the following elemental analysis:

Calculated for $C_{15}H_{22}FNO_3$: C, 63.58; H, 7.83; F, 6.70; N, 4.94. Found: C, 63.48; H, 8.05; F, 6.39; N, 4.93.

EXAMPLE 3

*3-[2-(3,5-Dimethyl-2-Oxocyclohexyl)-2-Chloroethyl] Glutarimide*

By substituting the N-(2-chloro-1,1,2-trifluoroethyl) diethylamine in Example 2 by N,N - diethyl-1,2,2-trichlorovinylamine there is obtained 3-[2-(3,5-dimethyl-2-oxocyclohexyl)-2-chloroethyl]glutarimide.

The N,N-diethyl-1,2,2-trichlorovinylamine is prepared by the procedure of A. J. Speziale and R. C. Freeman, J. Am. Chem. Soc., 82, 907 (1960).

I claim:

1. 3-[2-(3,5-dimethyl - 2 - oxocyclohexyl)-2-fluoroethyl] glutarimide.

2. 3 - [2 - (3,5-dimethyl - 2 - oxocyclohexyl) - 2 - chloroethyl]glutarimide.

3. The process for the preparation of 3-[2-(3,5-dimethyl-2-oxocyclohexyl)-2-fluoroethyl]glutarimide which comprises reacting cyclohexamide with a fluorinating agent having the formula:

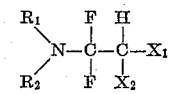

(I)

wherein $X_1$ is selected from the class consisting of chlorine and fluorine, $X_2$ is selected from the class consisting of chlorine, fluorine, and trifluoromethyl, $R_1$ and $R_2$ taken individually represent lower-alkyl, and $R_1$ and $R_2$ taken together with >N— constitute a saturated heterocyclic radical containing from 5 to 7 ring atoms, inclusive, one of which, in addition to the amino nitrogen, is selected from the group consisting of carbon, nitrogen, oxygen, and sulfur, the other ring atoms being carbon.

4. A process for the preparation of 3-[2-(3,5-dimethyl-2-oxocyclohexyl)-2-chloroethyl]glutarimide which comprises reacting cycloheximide with N,N-diethyl-1,2,2-trichlorovinylamine.

No references cited.